UNITED STATES PATENT OFFICE.

ANTON WEINDEL, OF LEVERKUSEN, NEAR COLOGNE, GERMANY, ASSIGNOR TO FARBENFABRIKEN VORM. FRIEDR. BAYER & CO., OF ELBERFELD, GERMANY, A CORPORATION OF GERMANY.

PROCESS OF PRODUCING CONDENSATION PRODUCTS FROM PHENOLS WITH FORMIC ALDEHYDE.

1,039,859.

Specification of Letters Patent. Patented Oct. 1, 1912.

No Drawing. Application filed January 21, 1911. Serial No. 603,908.

*To all whom it may concern:*

Be it known that I, ANTON WEINDEL, doctor of philosophy, chemist, citizen of the German Empire, residing at Leverkusen, near Cologne, Germany, have invented new and useful Improvements in New Processes for Producing Condensation Products from Phenols with Formic Aldehyde, of which the following is a specification.

This invention relates to a method of producing synthetic resins and of controlling the condensation of phenols and formaldehyde. Ever since Bayer in 1872 showed that phenols and formaldehyde react upon each other, this reaction has been studied by many investigators. Tollens, as shown by Hosæus, (*Berl. Berichte* 1892, p. 3214) already obtained the various series of products of condensation of phenols and formaldehyde which were either soluble or difficultly soluble or insoluble in the ordinary organic solvents or in alkali. Henschke (German Patent 157,533, of February 22, 1903), showed that the soluble variety of these products of condensation was converted into the insoluble variety by higher heating. A practical application of these condensation products, also known as synthetic resins, was first pointed out by Smith (German Patent 112,685 of October 10, 1899), who describes sheets and slabs which could be sawed, cut, molded and polished. Blumer (French Patent 329,982, March 5, 1903) was the first to demonstrate the use of the alcohol soluble variety of these synthetic resins as shellac substitutes. It has become of importance to regulate the process of condensation so that either the alcohol soluble varieties or the insoluble varieties might be formed.

I have found that by the addition of salts of such sulfur acids which contain sulfur in the form of a lower degree of oxidation than that contained in sulfurous acid namely salts of hydrosulfurous acid $H_2S_2O_4$, which is a stable compound and is known in a free form and in the form of salts (hydrosulfites) or of sulfoxylic acid, the acid of the formula $H_2SO_2$ which is not known in the free state but only in the form of salts in double combination with formaldehyde, such as the formaldehyde-sulfoxylate of sodium, the condensing of phenols with formaldehyde, employing acid substances as agents of condensation, may be arrested or retarded at any stage of the reaction.

If the above retarding agents are added to the mass of reaction before the formation of the alcohol insoluble condensation products has started, the mass may be heated further without substantially changing the alcohol soluble variety into the alcohol insoluble variety. If, however, the alcohol soluble varieties are further heated without the addition of the above retarding agents, then the alcohol insoluble varieties may be obtained. They can also be obtained by retarding the reaction by addition of an insufficient quantity of hydrosulfite, see Example 3.

Example 1: 1,000 parts of phenol are mixed with 1,000 parts of an aqueous solution of formaldehyde containing 40 per cent. formaldehyde and 10 parts of hydrochloric acid of 24° Bé. The mixture is boiled until the separation of oil is observed, which is usually the case after a few minutes. Then 10 parts of hydrosulfite of sodium are added, when the condensation is immediately arrested. The separated, colorless oil congeals on cooling to a pasty, plastic compound which on reheating melts and assumes a consistency which permits pouring. To completely purify the oil, it is stirred up with either cold or warm water or steam is conducted into the mass. It is soluble in the ordinary organic solvents, like alcohol and acetone and insoluble in water and acids. It may be used as a shellac substitute.

Example 2: 1,000 parts of phenol are mixed with 1,000 parts of an aqueous solution of formaldehyde containing 40 per cent. formaldehyde and 20 parts of hydrochloric acid of 24° Bé. The mixture is heated as above until the separation of oil is observed, then 17 parts of formaldehyde-sulfoxylate of sodium are added, whereupon the reaction is arrested. The mass thus obtained is water clear, almost colorless and congeals on cooling to a white, opaque plastic compound. The mass is soluble in the ordinary organic solvents, such as alcohol, acetone and acetic ether, insoluble in water and acids. On heating formaldehyde is generated and upon heating to about 140° C. resinous products are obtained which may be used as shellac substitute.

Example 3: 1,000 parts of phenol are mixed with 1,000 parts of an aqueous solution of formaldehyde containing 40 per cent. formaldehyde and 10 parts of hydrochloric acid of 24° Bé. The mixture is boiled until the separation of oil is observed. Then 7 to 8 parts of hydrosulfite of sodium or 11 to 14 parts of formaldehyde-sulfoxylate of sodium are added. The mixture which still contains a small quantity of free hydrochloric acid is further boiled the condensation being not totally arrested as in Example 1, until a white viscoid mass is obtained being a solid after cooling. It is insoluble in the usual organic solvents.

Instead of phenol homologues of phenol and analogous substances such as oxybenzyl-alcohol

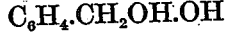

may be used. Instead of formaldehyde, paraform or similar aldehyde substances may be employed. Instead of the hydrosulfite of sodium, other salts of hydrosulfurous acid may be employed, for example the zinc double salt described in German Patent No. 217,038.

I claim:—

1. In the production of phenol-aldehyde condensation products the process which comprises arresting or retarding the condensation reaction by adding to the reaction mass a salt of a sulfur acid which contains sulfur in a lower state of oxidation than in sulfurous acid.

2. In the production of phenol-aldehyde condensation products the process which comprises arresting or retarding the condensation reaction by adding to the reaction mass a salt of hydrosulfurous acid.

3. The process of producing phenol-aldehyde condensation products which comprises condensing a phenol and an aldehyde by heating in the presence of an agent promoting the condensation reaction until the separation of the condensation product takes place, adding a salt of a sulfur acid which contains sulfur in a lower state of oxidation than in sulfurous acid, and isolating the resulting product of condensation, substantially as described.

4. The process of producing phenol-aldehyde condensation products which comprises condensing a phenol and an aldehyde by heating in the presence of an agent promoting the condensation until the separation of the condensation product takes place, adding a salt of hydrosulfurous acid, and isolating the resulting product of condensation, substantially as described.

In testimony whereof I have hereunto set my hand in the presence of two subscribing witnesses.

ANTON WEINDEL. [L. S.]

Witnesses:
WALTER VONNEGUT,
ALFRED HENKEL.